Feb. 24, 1931.  E. V. CAMP  1,793,674
ROAD GUARD
Filed June 2, 1930

Inventor
Eugene V. Camp.
By Ritter, Muchlin & O'Neill
Attorneys

Patented Feb. 24, 1931

1,793,674

UNITED STATES PATENT OFFICE

EUGENE V. CAMP, OF ATLANTA, GEORGIA

ROAD GUARD

Application filed June 2, 1930. Serial No. 459,008.

The invention relates to road guards of the general type shown and described in my copending application Serial No. 312,234, filed October 13, 1928, and of which the present application is a division in part, the guard comprising cables stretched between and secured to rigid spaced supports, such as posts, by means of spring connectors comprising sheet steel sections bent to approximately annular form, each having one face secured to a support and the other face connected to a cable or cables, the axes of the connectors being substantially vertical; whereby the shock of impact of a vehicle on the cable or cables will be absorbed by the flexure of the latter at the point of contact and the lateral and normal flexing of the spring connectors and the reaction of the cable and the spring supports will divert the impacting vehicle back onto the road.

The invention is illustrated in the accompanying drawings, in which:—

Figure 1:
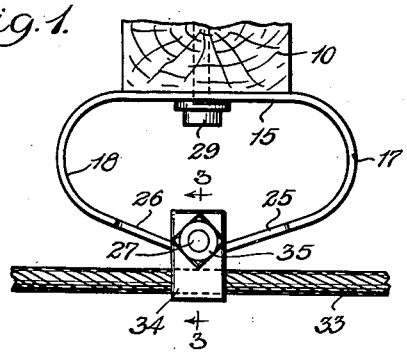
Fig. 1 is a fragmentary plan view of the guard structure, including a post, a spring connector and the spaced cables locked to the same.
Figure 2:
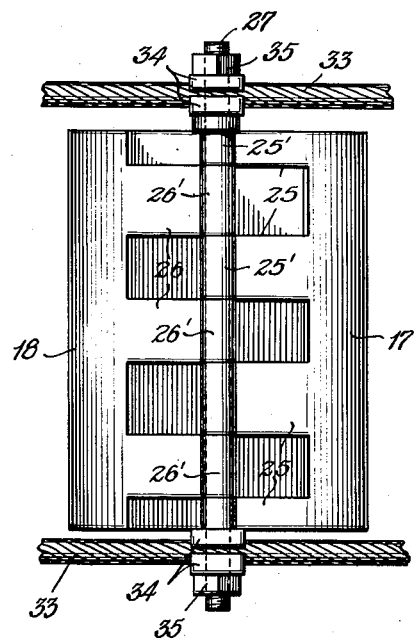
Fig. 2 is a front elevation of the spring connector and the associated cables.
Figure 3:
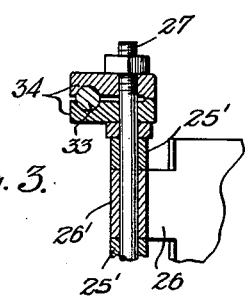
Fig. 3 is a section on line 3—3 of Fig. 1.

Referring to Figs. 1 to 3 of the drawings, 10 indicates one of a series of spaced posts or similar supports disposed at intervals along the highway and which, obviously, may be substituted by the parapet of a bridge or other rigid supporting means.

Secured to one face of the post 10 is a spring connector, which, in the form shown, comprises a section of sheet steel or the like bent to substantially annular form to provide lateral spring arms 17 and 18, the ends of which are notched to provide interengaging tongues 25 and 26, the extreme ends of which tongues are formed into eyes or loops 25' and 26', which may be brought into vertical alignment and are adapted to receive a bolt or pin 27, which locks the ends of the several tongues together. The spring support is secured to one face of the post by any suitable fastening means, such as a bolt 29, so that the axis of the spring support will be substantially vertical, or approximately parallel with the longitudinal axis of the post.

Mounted on each end of the rod or bolt 27 is a clip consisting of two jaws 34, which are adapted to be set up into clamping relation by nuts 35 engaging the threaded ends of the bolts 27.

Each of the clips 34 is adapted to embrace and securely lock to the spring support one of a spaced pair of wire cables 33, which are stretched under tension before they are clamped to the respective supports, and which, therefore, will constitute an inherently resilient barrier at an elevation to be engaged by an automobile which has been deflected off the road surface either by accident or design.

It will be understood that the spring support and the associated cables are located at a proper distance above the ground so as to be engaged by the wheels or the laterally projecting parts of a motor vehicle, with the result that the force of the impact of the vehicle against the cables will be taken up by the normal resiliency of the cables themselves and the compound spring action of the connectors, which latter are capable of flexing laterally in either direction and also normally with respect to the post or other support.

Inasmuch as the cables are rigidly locked to each of the spring supports, the force delivered against the cables by any impacting vehicle will be distributed throughout a series of the spring supports and the shock will be gradually absorbed without serious impairment to the guard or to the impacting vehicle. In the event that the impact of the vehicle is head on, the resiliency of the cables and their spring supports will quickly arrest the forward movement of the vehicle and the reflex action of the cables and the spring supports will force the impacting vehicle back onto the road surface. If the impact of the vehicle upon the cables is delivered at an angle, the vehicle will slide along the cables and will be gradually and easily guided back onto the roadway.

Figure 4:
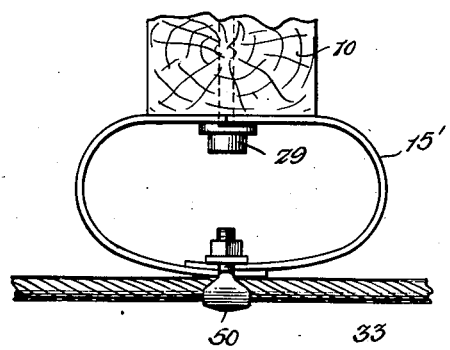
Fig. 4 is a view similar to Fig. 1 showing a modified form of spring connector.
Figure 5:
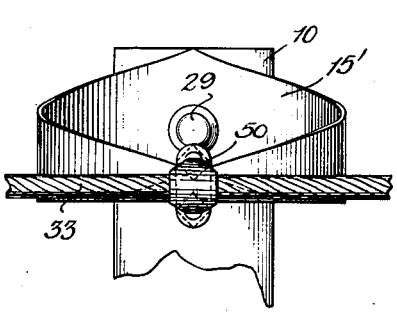
Fig. 5 is a fragmentary elevation of the modification shown in Fig. 4.

Instead of providing a single spring support or mounting for both cables, as shown in Figs. 1 and 3, a simplified individual mounting for each cable may take the form illustrated in Figs. 4 and 5. In this case, the spring support is fashioned from a triangular strip of sheet steel 15', which is bent into annular form with its ends overlapping and preferably secured together, as by spot welds or the like, so that the spring connector may be attached to a post or other support by the usual bolt 29 passing through an opening in the wider portion of the connector and the latter will be supported with its axis substantially vertical, or parallel with the longitudinal axis of the post or support 10.

A wire cable 33 is stretched under tension between the several posts or supports and is connected to each of the spring connectors 15' by means of a shackle 50. With this type of support, a single cable may suffice, but, if two cables are required in the general relation indicated in Figs. 1 and 2, each post will be supplied with two spring connectors 15' attached to the post in properly spaced vertical relation and the respective cables will be attached to each spring connector on the separate posts and will be maintained under longitudinal tension in the same order and arrangement as in the preceding modification.

To effect the necessary tension or tautness in the cable or cables, the latter may be stretched between terminal posts or anchoring means and the intermediate length or lengths attached to the individual spring supports, or, as will be preferred in most cases, the cable or cables may be stretched taut between successive posts and rigidly clamped to the spring supports thereon by the shackles.

What I claim is:

1. A road guard, comprising a series of spaced supports, annular spring metal connectors fixed to one face of the supports and a cable stretched between and connected to the outer faces of said connectors.

2. A road guard, comprising a series of spaced supports, annular spring metal connectors fixed to one face of the supports with their axes substantially vertical, and a wire cable stretched between and connected to the outer faces of said connectors.

3. A road guard, comprising a series of spaced supports, spring connectors fixed to one face of the supports, each connector comprising a triangular strip of sheet steel bent into ring form with the ends thereof overlapping, the axis of the supports being substantially vertical, a wire cable stretched along the series of supports, and shackles connecting the cable to the outer faces of the connectors.

4. A road guard, comprising a series of spaced posts, a spring connector fixed to one face of each post, each connector comprising a triangular strip of sheet steel bent to ring form with its ends overlapping and fastened together and with its axis substantially parallel with that of its associated post, a cable stretched along the series of posts, and shackles connecting the cable to the overlapping ends of the connectors.

In testimony whereof I affix my signature.

EUGENE V. CAMP.